United States Patent
Schiek et al.

(10) Patent No.: US 6,587,073 B2
(45) Date of Patent: Jul. 1, 2003

(54) FREQUENCY-SIGNAL PROCESSING METHOD

(75) Inventors: Burkhard Schiek, Bochum (DE); Thomas Much, Mülheim (DE); Michael Küppers, Essen (DE); Uwe Wegemann, Sprockhövel (DE); Detlef Brumbi, Moers (DE)

(73) Assignee: Krohne Messtechnik GmbH & Co. KG (DE)

( * ) Notice: Subject to any disclaimer, the term of this patent is extended or adjusted under 35 U.S.C. 154(b) by 0 days.

(21) Appl. No.: 10/125,992

(22) Filed: Apr. 19, 2002

(65) Prior Publication Data

US 2002/0154053 A1 Oct. 24, 2002

(30) Foreign Application Priority Data

Apr. 20, 2001 (DE) ........................................ 101 19 693.8
Feb. 18, 2002 (DE) ........................................ 102 06 858.5

(51) Int. Cl.$^7$ ............................................. G01S 13/08
(52) U.S. Cl. ........................ 342/124; 342/118; 342/195; 342/196
(58) Field of Search ................................ 342/118, 123, 342/124, 194, 195, 196

(56) References Cited

U.S. PATENT DOCUMENTS

| | | | |
|---|---|---|---|
| 3,879,661 A | * | 4/1975 | Collins ...................... 324/76.24 |
| 4,208,632 A | * | 6/1980 | Sheldon et al. ................ 327/70 |
| 4,604,717 A | * | 8/1986 | Kaplan ......................... 702/79 |
| 4,771,287 A | * | 9/1988 | Mims ........................... 342/25 |
| 4,937,583 A | * | 6/1990 | Poinsard ...................... 342/195 |
| 5,099,243 A | * | 3/1992 | Tsui et al. ................ 324/76.47 |
| 5,293,114 A | * | 3/1994 | McCormick et al. ..... 324/76.22 |
| 5,302,956 A | * | 4/1994 | Asbury et al. ................. 342/70 |
| 5,323,103 A | * | 6/1994 | Choate et al. ............ 324/76.22 |
| 6,147,560 A | * | 11/2000 | Erhage et al. .............. 331/1 R |

OTHER PUBLICATIONS

W. McCormick, J. B. Y. Tsui, V. L. Bakke, "A Noise Insensitive Solution to an Ambiguity problem in Spectral Estimation" IEEE Transactions an Aerospeace and Electronic Systems, Sep. 1989, vol. 25, No. 5 pp. 729–732.*

* cited by examiner

Primary Examiner—Thomas H. Tarcza
Assistant Examiner—Isam Alsomiri
(74) Attorney, Agent, or Firm—Cesari and McKenna, LLP

(57) ABSTRACT

A method for the processing of a frequency signal especially for utilization in the evaluation of a distance measurement by means of pulsed electromagnetic waves or of frequency-modulated continuous waves on the basis of the radar principle. The frequency signal is divided into at least two frequency ranges corresponding to two main components of the frequency signal, the frequency signal in each of the two frequency ranges is then subjected to a separate Fourier transform, the Fourier transform applied to the frequency signal in the first frequency range resulting in a corresponding first complex time signal and the Fourier transform applied to the frequency signal in the other frequency range resulting in a second complex time signal. The second time signal is complex-divided by the first time signal which produces a third time signal, and the third time signal is then subjected to a Fourier transfer, the result being a processed frequency signal.

14 Claims, 3 Drawing Sheets

FREQUENCY-SIGNAL PROCESSING METHOD

This invention relates to a method for the processing of a frequency signal, for use in particular in the evaluation of distance measurements by means of pulsed electromagnetic waves or of continuous-mode frequency-modulated electromagnetic waves, employing the radar principle. This invention further relates to a distance measuring device incorporating a transmitter, a receiver, a measuring path extending from the transmitter to the receiver, and at least one reference path extending from the transmitter to the receiver.

The term frequency signal in this case refers to a signal $R(\omega)$ which describes a frequency spectrum defined by the amplitude R as a function of the frequency $\omega$. Accordingly, the term time signal in this case signifies a signal $r(t)$ defined by the amplitude r as a function of time.

BACKGROUND OF INVENTION

Non-contact gap-scanning distance and fill-level measurements by a variety of methods utilizing acoustic or electromagnetic waves have been described in the prior art. A transmitter sends sound or electromagnetic waves toward a target where they are reflected and then collected by a receiver. In a fill-level gauge, for example, electromagnetic waves travel from a transmitter vertically into a tank where they are reflected by the surface of the substance in the tank and sent back to a receiver. The run time of the transmitted and reflected signal permits a direct or indirect determination of the distance between the transmitter and/or receiver and the surface of the substance in the tank. Direct distance determinations employ, for instance, a pulse-count process in which the distance-measuring signal is composed of short pulses. Given the short run time of the signal, any direct time measurement is virtually impossible which is why a sampling method is used. One approach to indirect distance measurements involves a process that employs a frequency-modulated, continuous-mode high-frequency time signal, or FMCW, short for Frequency Modulated Continuous Wave. In this case, consecutive frequency sweeps serve to expand the frequency of the signal for instance in linear fashion, permitting the determination of the run time of a back-reflected signal by way of the differential frequency relative to the frequency attained by the sweep as of the time of the back-reflection. A corresponding time signal with the low-pass differential frequency is typically generated via a mixer to which both the sweep signal and the retroreflected signal are fed.

The accuracy and reliability of such distance measurements by means of wave reflection can be increased by employing a reference signal that travels along a predefined, known reference path. This reference signal is used for calibrating the effective measuring signal that traverses the actual measuring path from the transmitter via the reflecting surface back to the receiver. U.S. Pat. No. 4,665,403 describes, for instance, a microwave-based fill-level gauge whose reference path is in the form of a reference circuit into which the transmitted signal is fed and at whose end it is reflected, thus generating a reference signal for a predefined, known propagation path. It is also possible, however, to integrate the entire reference path as part of the measuring path by providing in the measuring path, for instance, a semireflective element which reflects part of the transmitted signal before the latter impinges on the surface which will reflect it back essentially in its entirety. An example thereof is described in the German publication DE 42 40 491 C2.

However, these prior-art approaches are afflicted with a variety of problems. In many cases, a simple design without a reference path is not good enough for highly precise distance measurements. On the other hand, in the existing concepts which do employ a reference path, it is often difficult to include the reference signal as an integral factor in the evaluation. Most of all, less than ideal pulse patterns in the pulse-mode process or dispersions and amplitude characteristics in the FMCW approach complicate the evaluation, so that at times the accuracy and the reliability of the distance measurements are inadequate.

SUMMARY OF THE INVENTION

It is therefore the objective of this invention to introduce a method for the processing of a frequency signal and a corresponding distance measuring device by means of which the aforementioned problems can be avoided or neutralized.

The frequency-signal processing method which achieves this objective is characterized in that the frequency signal is divided into at least two frequency ranges corresponding to two main components of the frequency signal and the frequency signal is subjected in each of the two frequency ranges to a separate Fourier transform, whereby the Fourier-transformed component of the frequency signal in one frequency range is generated resulting in a first complex time signal while the Fourier-transformed component of the frequency signal in the other frequency range is generated resulting in a second complex time signal, the second time signal is complex-divided by the first time signal which generates a third time signal, and the third time signal is subjected to a Fourier transform the product of which is a processed frequency signal.

Employing the pulse-mode process described further above, the processing method according to this invention permits direct application in the evaluation of a distance measurement. If the distance measurement is to be based on the FMCW process, also described further above, one additional step will be necessary. The reason is that in the FMCW process, the first signal available is a time signal, that being the low-pass signal generated in the mixer, from which by means of a Fourier transform, a frequency signal must be derived first.

While the frequency-signal processing method according to this invention offers versatile applicability, a preferred conceptual embodiment of the invention provides for the process to be used in the evaluation of a distance measurement employing pulsed electromagnetic waves and frequency-modulated continuous-mode electromagnetic waves based on the radar principle. As another preferred feature in this context, the frequency signal encompasses an effective measuring signal corresponding to the run time along a measuring path and a reference signal corresponding to the run time along a reference path and the two main components of the frequency signal are representative of the effective measuring signal and, respectively, the reference signal. It is the effective measuring signal which, sent by a transmitter, reflected off a surface and collected by a receiver, serves to measure the actual distance. The calibration of this effective measuring signal is performed by means of the reference signal which is established by its passage along a known, predefined reference path.

It has been found that the method according to this invention delivers particularly accurate and reliable results when the maximum peak of the effective measuring signal and the maximum peak of the reference signal are spaced apart by at least half the amplitude width of either signal. Indeed, the maxima of the effective signal and the reference signal are preferably spaced apart by at least the full width of the measuring signal and the reference signal at the 10% level of the amplitude height of either signal. And most desirably, the maxima of the effective measuring signal and the reference signal are spaced apart by several times, preferably at least five times, the width of the measuring signal and the reference signal at the 10% amplitude height level of either signal.

A preferred embodiment of the frequency-signal processing method employs a large signal bandwidth. The preferred modulation bandwidth of the frequency signal is at least 500 MHz. In the case of a pulse-mode process, this requires short pulse lengths while in the case of an FMCW process, a suitably large frequency deviation must be applied.

The basic concept of the frequency-signal processing method according to this invention does not limit it to a specific frequency range of electromagnetic waves. However, the electromagnetic waves utilized in a preferred version of the invention are light waves especially in the visible or infrared spectral range. In a preferred embodiment of the invention, the reference path is defined by the reflection of the light off the surface of a lens. When the electromagnetic waves employed are light waves especially in the visible or infrared wavelength range, another preferred version of the invention utilizes fiber optics at least for part of the measuring and/or the reference path. When the electromagnetic waves used are light waves, it stands to reason that the frequency modulation referred to further above is not limited to a modulation of the light frequency but can, in fact, be a frequency modulation of the light intensity as well, whereby the light beam becomes a "modulated carrier".

In another desirable version of the invention, the electromagnetic waves employed are microwaves which are transmitted and received via the common transmitting and receiving antenna or, respectively, by a transmitter antenna and a separate receiver antenna. In a preferred conceptual version of the invention, the reference path is defined by the reflection of the microwaves off a specific point at the transceiver antenna or separate transmitter antenna. Most desirably, that specific point on the transceiver or transmitter antenna is the end of the transceiver or transmitter antenna in view of the fact that, given the less than ideal impedance termination at that end, part of the transmitted signal is reflected.

The distance measuring device according to this invention which achieves the objective outlined above based on the concept described in the preamble, is characterized in that, as a first design feature of the invention, the measuring path includes a delay line. Thus, for a clear separation in time of the effective measuring signal from the reference signal, such separation between the two signals is not obtained over a reference path of great length, but by virtue of the delay line that is integrated into the measuring path.

Specifically, the run time of the electromagnetic waves from the transmitter to the receiver along the measuring path which includes the delay line, is longer than the run time of the electromagnetic waves from the transmitter to the receiver along the reference path. If the propagation rate of the electromagnetic waves along the measuring path with the delay line is the same as that along the reference path, it means that the measuring path with the delay line is longer than the reference path. The run time of the electromagnetic waves from the initial point of the delay line to the end of the delay line is preferably longer than the run time of the electromagnetic waves from the transmitter to the receiver along the reference path. This means that, with identical propagation rates along the delay line and, respectively, along the reference path, the delay line is longer than the reference path.

The distance measuring device according to this invention which achieves the objective outlined above based on the concept described in the preamble, is further characterized in that it is provided with multiple delay lines each of which can be selectively connected to the measuring path or to the reference path. Thus, as a basic design feature, any one of these delay lines can be selectively interpolated in the measuring path or in the reference path. In a preferred design version of this invention, however, either a minimum of two different delay lines are provided for selective interpolation in the measuring path only, or a minimum of two different delay lines are provided for selective interpolation in the reference path only.

Specifically, each such delay line is connectable, and each such delay line when connected causes the run time of the electromagnetic waves from the transmitter to the receiver along the measuring path to be different from the run time of the electromagnetic waves from the transmitter to the receiver along the reference path. Accordingly, given identical propagation rates of the electromagnetic waves along the measuring and reference paths, an interpolation of a delay line causes the length of the measuring path to be different from the length of the reference path. Thus, by virtue of an interconnection of delay lines into the measuring path or reference path, it is possible to obtain significantly different run times for the effective measuring signal and, respectively, for the reference signal.

In other words, this invention provides for the incorporation of multiple delay lines, one of which is used as the "active" delay line by selective interpolation into the measuring path or into the reference path. In this fashion, it is possible to obtain for a very broad range of measuring distances, meaning the distance to the surface which reflects the transmitted measuring signal back to the transmitter or receiver, a significant difference in run time between the measuring signal and the reference signal. If the difference in time between the measuring signal and the reference signal would normally be too small, one simply interconnects a longer delay line to reestablish an adequate time space between the measuring signal and the reference signal.

As stated further above, the invention is not limited to the use of a specific frequency range of the electromagnetic waves. However, in a preferred embodiment of this invention, the electromagnetic waves employed are light waves especially in the visible or infrared spectrum range, permitting the use of optical switches for the interpolation and decoupling of the delay lines. In particular, the optical switches used are transmissive LCD cells.

BRIEF DESCRIPTION OF THE DRAWINGS

There are numerous ways in which the frequency-signal processing method according to this invention, and the distance measuring device according to this invention, can be designed, enhanced and implemented. Reference is made to the dependent claims and to the following detailed description of the preferred embodiments of this invention with the aid of the attached drawings, in which:

DESCRIPTION OF THE PREFERRED EMBODIMENTS

Figure 1:
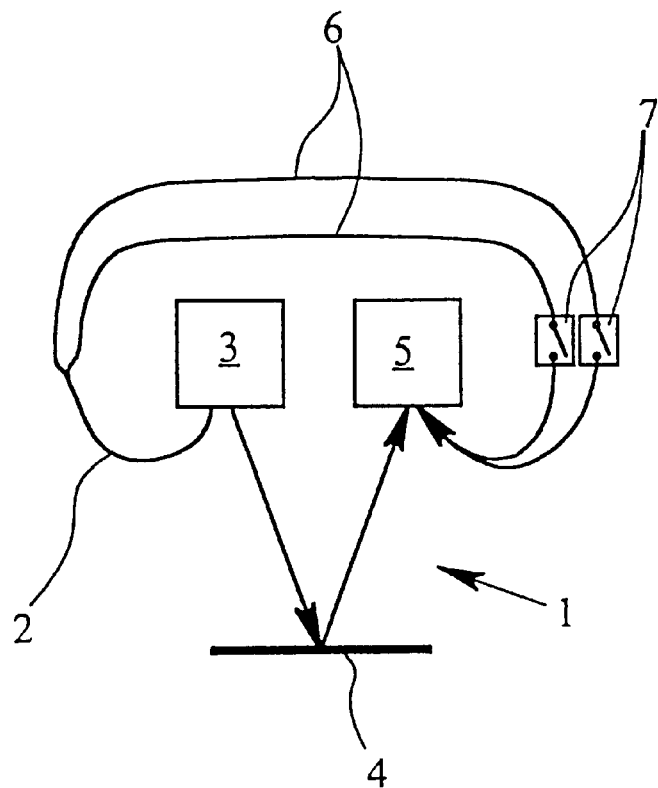
FIG. 1 is a schematic diagram of a distance measuring device according to a first embodiment of this invention, incorporating two delay lines which can be selectively interconnected to the reference path.

FIG. 1 shows in schematic fashion the design of a distance measuring device according to a first embodiment of this invention. The distance measuring device includes a measuring path 1 and a reference path 2. The measuring path 1 extends from a transmitter 3 to a surface 4 which reflects the signal, sent by the transmitter 3, back to a receiver 5. Two delay lines 6 are provided, permitting interpolation into the reference path 2.

The distance measuring device shown in FIG. 1 and representing a first embodiment of this invention employs electromagnetic waves in the form of light waves in the visible spectrum range. This makes it possible to use fiber optics for the reference path 2 including the delay lines 6. The interpolation into and decoupling of the fiber optic lines 6 from the reference path 2 takes place by means of optical switches 7, schematically outlined in FIG. 1, which are constituted of transmissive LCD cells.

As can be clearly seen in FIG. 1, the two delay lines 6 are of different lengths. The outer or upper delay line 6 is longer than the inner or lower delay line 6. Depending on the length of the measuring path 1 which is defined by the distance from the transmitter 3 to the surface 4 and from there to the receiver 5, this allows for the selection of a length of the reference path 2, encompassing the delay line 6, that causes the run times of the effective measuring signal along the measuring path 1 and that of the reference signal along the reference path 2 to be sufficiently different.

Figure 2:
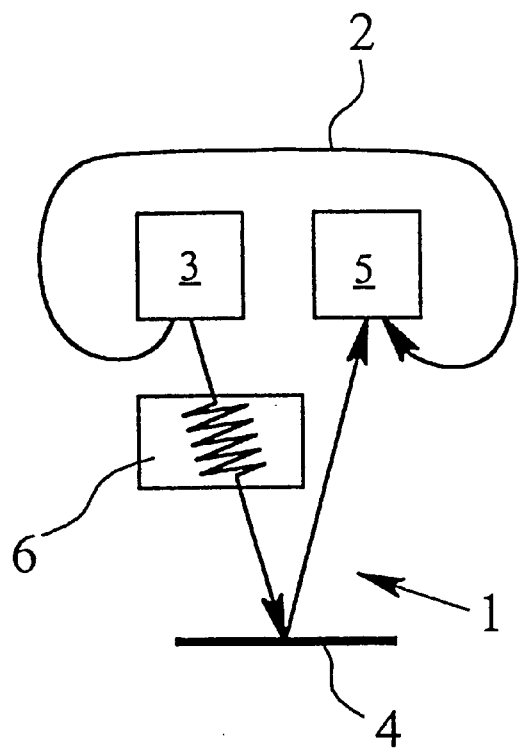
FIG. 2 is a schematic diagram of a distance measuring device according to a second invention embodiment, with a delay line incorporated in the measuring path.

According to a second embodiment of a distance measuring device per this invention, shown in FIG. 2, a sufficiently large difference between the run time of the measuring signal along the measuring path 1 and the run time of the reference signal along the reference path 2 is also attainable by integrating a delay line 6 in the measuring path 1. FIG. 2 provides only a schematic indication to the effect that the delay line 6 in the second embodiment of this invention is longer than the reference path 2. This ensures that, regardless of the distance between the surface 4 which reflects the measuring signal and the receiver 5, the measuring path 1 with the delay line 6 will be longer than the reference path 2.

Figure 3:
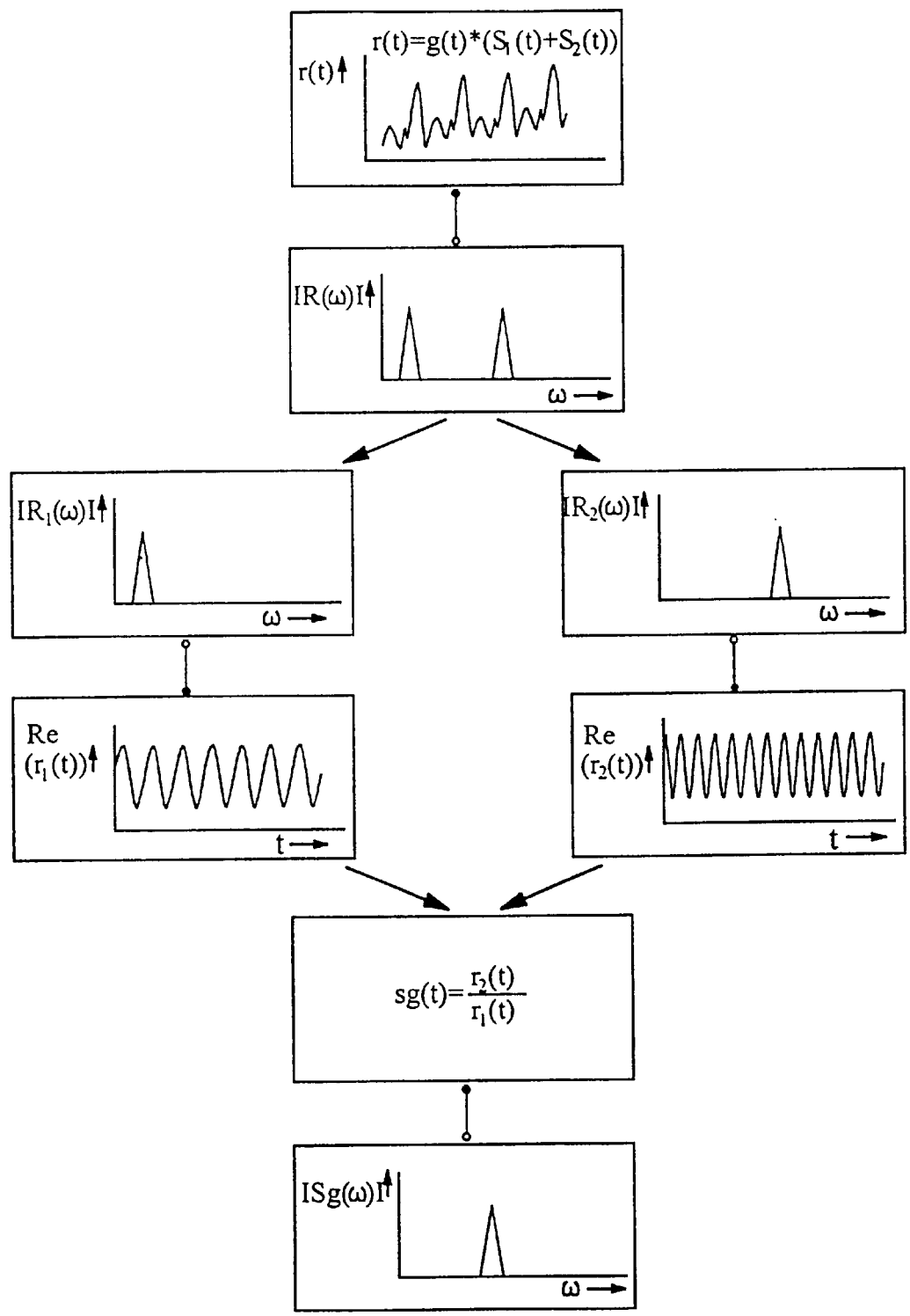
FIG. 3 is a schematic illustration of the processing method for a frequency signal derived from a time signal in a third embodiment of this invention.

FIG. 3 shows in schematic fashion the progression of a frequency-signal processing cycle according to a third embodiment of this invention. The processing method in this embodiment is applied in the FMCW mode. Shown at the top is the time signal r(t) which is collected by the receiver 5 of the distance measuring device. The time signal r(t) is derived from the sum of the reference signal $S_1(t)$ and the measuring signal $S_2(t)$ multiplied by the gain factor g(t) of the receiver 5. This time signal r(t) is generated by a mixer, not shown, in the receiver 5. For generating a frequency signal to which the processing method according to the third embodiment of this invention is applied, the time signal r(t) is subjected to a Fourier transform whereby a frequency signal $R(\omega)$ is obtained. As can be seen in FIG. 3, this frequency signal $R(\omega)$ essentially contains two main components which correspond to the reference signal $S_1(t)$ and to the measuring signal $S_2(t)$, respectively.

The frequency signal $R(\omega)$ thus obtained is now divided into two mutually different frequency ranges, each containing one of the two main components of the frequency signal $R(\omega)$, the result being two frequency signals $R_1(\omega)$ and $R_2(\omega)$. These two frequency signals $R_1(\omega)$ and $R_2(\omega)$ are then individually subjected to a Fourier transform whereby a first complex time signal $r_1(t)$ and a second complex time signal $r_2(t)$, corresponding to the reference signal and, respectively, to the measuring signal, are obtained. Thereupon the second time signal $r_2(t)$ is complex-divided by the first time signal $r_1(t)$ which results in a time signal sg(t). Next, this time signal sg(t) is again subjected to a Fourier transform, whereby a processed frequency signal $Sg(\omega)$ is obtained. That processed frequency signal is thus calibrated for the reference signal and can be processed further in conventional fashion for determining the distance between the surface 4 and the transmitter 3 and receiver 5, respectively.

Figure 4:
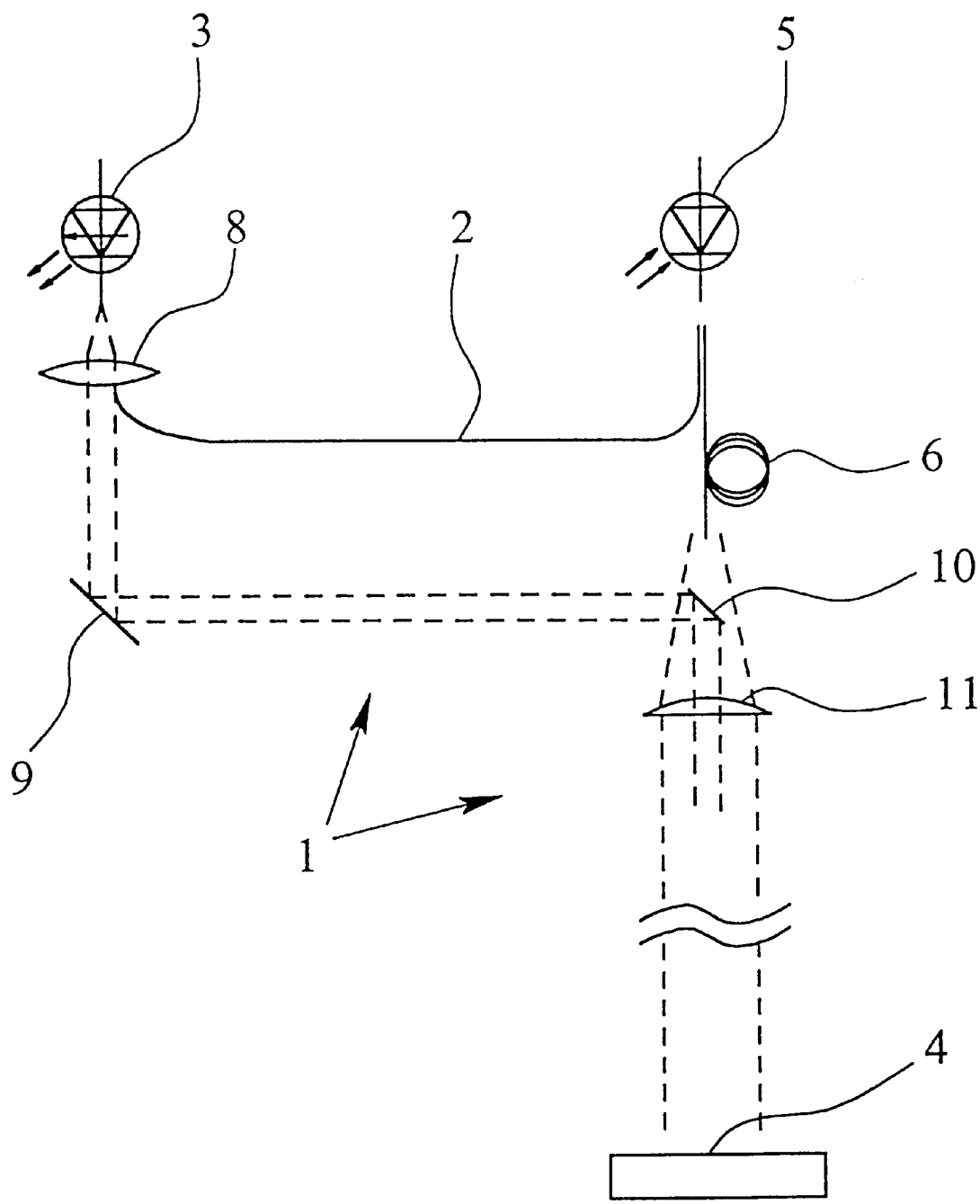
FIG. 4 is a schematic diagram showing the design of a distance measuring device according to a fourth embodiment of the invention, in which the electromagnetic waves employed are light waves.

Finally, FIG. 4 depicts a distance measuring device according to a fourth embodiment of this invention, using as the electromagnetic waves light in the visible spectral wavelength range. A laser diode serves as the transmitter 3. A lens 8 directs the light emitted by the laser diode into the measuring path 1 and into the reference path 2. The measuring path 1 continues via angled mirrors 9 and 10 to the surface 4 where it is reflected back. The retroreflected light impinges on a condenser lens 11 which focusses it on the input end of the delay line 6. The delay line 6 is constituted of a fiber optic cable. As can be surmised from FIG. 4, the fiber optic cable which constitutes the delay line 6 is at least as long as the fiber optic cable that forms the reference path 2. This ensures that at all times, the run time of the effective measuring signal along the measuring path with the delay line 6 will always be significantly longer than the run time of the reference signal along the reference path 2, clearly separating the measuring signal from the reference signal and allowing easy application of the method according to this invention.

What is claimed is:

1. A method for processing a frequency signal, said method comprising the steps of dividing the frequency signal into at least two frequency ranges corresponding to two main components of the frequency signal;

subjecting the frequency signal in each of the two frequency ranges to a separate Fourier transform, said Fourier transform applied to the frequency signal in the first frequency range resulting in a corresponding first complex time signal and the Fourier transform applied to the frequency signal in the other frequency range resulting in a second complex time signal;

complex-dividing the second time signal by the first time signal which produces a third time signal, and subjecting the third time signal to a Fourier transform, the result being the processed frequency signal.

2. The method as in claim 1, wherein the frequency signal encompasses an effective measuring signal as a function of the run time along a measuring path and a reference signal as a function of the run time along a reference path said measuring signal and said reference signal corresponding to two main components of the frequency signal.

3. The method according to claim 1 or 2 including the step of using the processed frequency signal in the evaluation of a distance measurement employing pulsed electromagnetic waves or frequency-modulated continuous waves based on the radar principle.

4. The method according to claim 3 including the steps of
using as the electromagnetic waves, light waves especially in the visible or infrared spectral wavelength range, and forming the measuring path and/or the reference path at least in part of fiber optic members.

5. A distance measuring device for measuring distances by means of electromagnetic waves based on the radar principle, utilizing the method according to claim 1 or 2 comprising a transmitter, a receiver, a measuring path including a delay line and extending from the transmitter to the receiver and at least one reference path extending from the transmitter to the receiver.

6. The distance measuring device according to claim 5, wherein the delay line is longer than the reference path.

7. The distance measuring device according to claim 5, wherein the electromagnetic waves are light waves in the visible or infrared spectral wavelength range and the delay line is a fiber optic cable.

8. The distance measuring device as in claim 5, wherein the reference path is at least in part and preferably in its entirety composed of a fiber optic cable.

9. A distance measuring device for measuring distances employing electromagnetic waves based on the radar principle, utilizing the method according to claim 1 comprising a transmitter, a receiver, a measuring path extending from the transmitter to the receiver and at least one reference path extending from the transmitter to the receiver, wherein the measuring path includes multiple delay lines any one of which can be selectively interpolated in the measuring path or the reference path includes multiple delay lines which can be selectively interpolated in the reference path.

10. The distance measuring device according to claim 9, wherein any one of the delay lines can be selectively interpolated in such fashion that upon interpolation of the respective delay line, the run time of the electromagnetic waves from the transmitter to the receiver along the measuring path differs from the run time of the electromagnetic waves from the transmitter to the receiver along the reference path.

11. The distance measuring device according to claim 10, wherein upon interpolation of the respective delay line, the length of the measuring path is different from the length of the reference path.

12. The distance measuring device according to claim 9 wherein the electromagnetic waves employed are light waves especially in the visible or infrared spectral wavelength range and the delay lines can be interpolated or disconnected by means of optical switches.

13. The distance measuring device as in claim 12, wherein the optical switches are transmissive LCD cells.

14. The distance measuring device according to claim 12, wherein the delay lines are fiber optic cables.

* * * * *